United States Patent [19]

Tomizawa et al.

[11] Patent Number: 4,668,976
[45] Date of Patent: May 26, 1987

[54] RADIATION RESISTANT COLOR TELEVISION CAMERA

[75] Inventors: Fumio Tomizawa, Hitachi; Katsuhiro Mizuno, Tokyo; Norihiko Ozaki, Mito; Kenji Tsuchita, Hitachiota, all of Japan

[73] Assignee: Hitachi, Ltd., Tokyo, Japan

[21] Appl. No.: 714,399

[22] Filed: Mar. 21, 1985

[30] Foreign Application Priority Data

Mar. 23, 1984 [JP] Japan .................................. 59-55717

[51] Int. Cl.⁴ ......................... H04N 9/64; H04N 9/67
[52] U.S. Cl. ......................................... 358/27; 358/37
[58] Field of Search ..................... 358/27, 36, 37, 100

[56] References Cited

U.S. PATENT DOCUMENTS

| | | | |
|---|---|---|---|
| 3,699,241 | 10/1972 | Larsen | 358/27 |
| 3,787,611 | 1/1974 | Poetsch et al. | 358/27 |
| 4,069,432 | 1/1978 | Bazin | 358/27 |
| 4,141,037 | 2/1979 | Nishimura et al. | 358/37 X |
| 4,223,342 | 9/1980 | Tsuchiya et al. | 358/37 |
| 4,313,130 | 1/1982 | Yost | 358/21 R |
| 4,559,554 | 12/1985 | Nitta | 358/37 X |

*Primary Examiner*—John M. Jillions
*Attorney, Agent, or Firm*—Antonelli, Terry & Wands

[57] ABSTRACT

Disclosed is a television camera having good color reproducibility which is secured to be maintained for a long time even in an atmosphere of high radiation, and in which the degree of deterioration in each color component signal due to radiation exposure is detected and the amplification degree of each color component signal is corrected in accordance with the detected degree of deterioration so as to make the color reproducibility come back to the state before radiation exposure.

4 Claims, 14 Drawing Figures

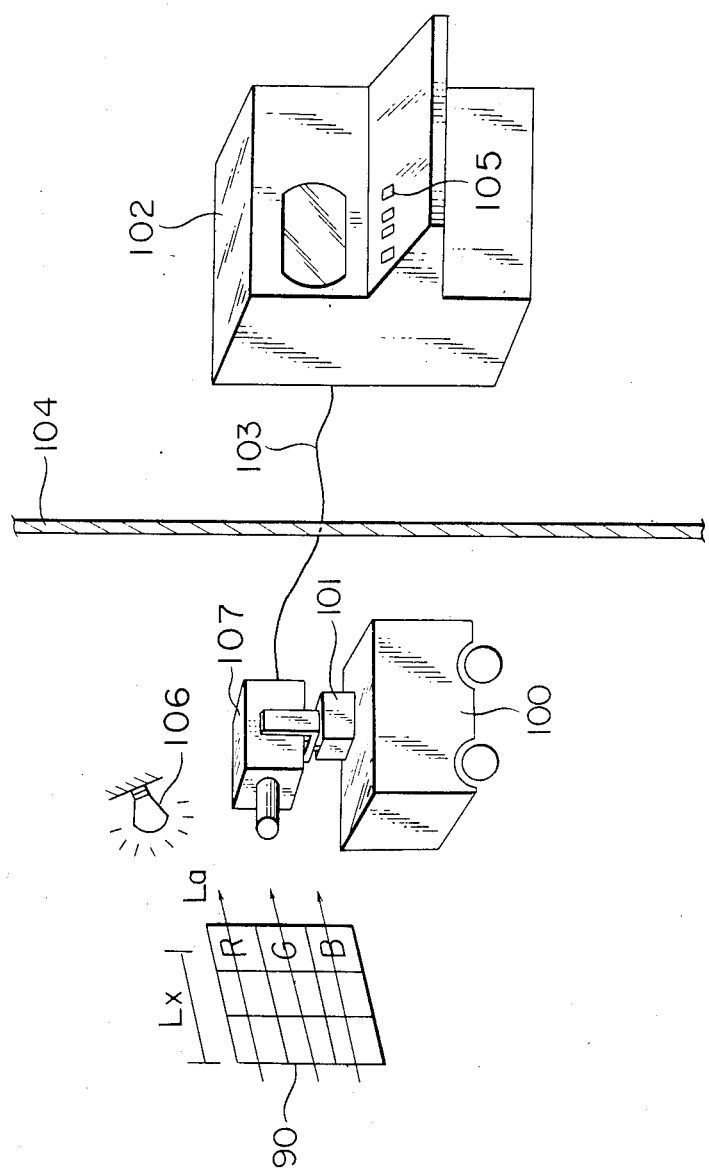

RADIATION RESISTANT COLOR TELEVISION CAMERA

BACKGROUND OF THE INVENTION

The present invention relates to a color television camera capable of being used in an atmosphere of radiation.

In a nuclear power plant, a space-ship, etc., there is provided a monitor television camera for supervising and inspecting installations. In such a location, the dosage of radiation is large in comparison with an ordinary location and the performance of a television camera can not be secured due to the influence of radiation if an ordinary television camera is employed.

For example, if a color television camera in which an image pickup tube, an amplifier, and a control circuit are integrated is subject to gamma-ray exposure, deterioration begins to occur in color reproducibility and in luminance signal level at the dosage of $10^3$ Rad, and the image pickup function vanishes at $10^4$ Rad, so that it can not be used in the circumstances of high dosage not smaller than $10^3$–$10^4$ ("high dosage" is defined as a dosage not smaller than $10^3$–$10^4$).

The causes of such deterioration in performance in a television camera due to radiation are as follows:

(I) Browning in lens and glass used in an image pickup tube due to radiation dosage:

In a color television camera, a color information of an object to be taken up is decomposed into the three primary colors (red component (R), green component (G), blue component (B)) so as to form a video signal. If browning occurs in a lens or a face plate of the image pickup tube, the transmittivity of the respective hue components decreases. The decrease in transmittivity of the blue component is especially remarkable.

(II) Deterioration in an SN ratio in a chrominance component processing circuit, especially in amplifiers, due to radiation exposure:

Noises due to radiation exposure are generated in semiconductor devices per se in a chrominance component processing circuit. Especially in an amplifier, the amplification of an amplifier element decreases so that the level of the signal component falls down and the SN ratio is deteriorated.

Generally, a color television camera is adjusted in advance such that the colors of picked-up image of the object can be reproduced into colors to be observed with the naked eye as faithfully by as possible. If the camera is exposed to radiation, the reproducibility of the camera may be deteriorated by the causes as described above.

Further, in a color television camera in which the frequency interleave system is employed as the color image pickup method, deterioration may occur in color reproducibility also by the following cause:

(III) Change in scanning speed (scanning frequency) of saw tooth wave of a horizontal deflection circuit:

In a color television camera of the frequency interleave type, color information is extracted through stripe filters on a face plate glass and separated into respective color information through filters corresponding to stripe frequencies. If the scanning frequency changes the time-base frequency of the stripe color filter changes, though the spatial frequency of the same does not change. Consequently, the chrominance component passing through a band pass filter for separating the chrominance component from a video signal decreases. Similarly to the cause (II) as described above, this change in scanning speed is caused by the influence of radiation onto semiconductor devices.

Conventionally, pure silica glass or radiation resistant glass doped with Ce (cerium) has been employed as lenses or as various kinds of glass used for an image pickup tube and bipolar elements having radiation resistance superior to MOS-FETs, or the like, have been used as circuit elements, thereby providing radiation resistance of the total color television camera.

In spite of such a countermeasure, however, the browning in glass might progress to deteriorate the color reproducibility if the color television camera was continuously used in an atmosphere of radiation. Further, such a restriction that bipolar elements have to be used as circuit elements caused problems that there occurred a difficulty in reduction in size of the circuit and that current consumption increased. Furthermore, in fact, it has been difficult to sufficiently prevent the deterioration from occurring even if such bipolar elements were used. Thus, there was a limit in the countermeasure to maintain the initial performance (that is, color reproducibility) for a long time only by constituting the elements composing a camera by using materials of relatively strong radiation resistance.

SUMMARY OF THE INVENTION

It is therefore an object of the present invention to provide a color television camera in which the problems in the prior art are solved so that the deterioration in color reproducibility due to radiation is corrected to secure the original color reproducibility for a long period of time.

To attain the object, the radiation resistant color television camera according to the present invention to provide a color television camera is provided with a circuit for correcting the deterioration in signal due to radiation. That is, the radiation resistant color television camera according to the present invention comprises a video signal generating circuit in which red, green and blue (R.G.B.) signals obtained by an image pickup device are waveform shaped and amplified to have a predetermined level so that a composite signal including a luminance signal and color information on the basis of the waveform shaped and amplified R.G.B. signals, and a signal correction circuit which controls the output of the video signal generating circuit in accordance with the quantity of deterioration in R.G.B. signals due to radiation exposure of the color television camera, so that the output of the video signal generating circuit is corrected to have the original level prior to the deterioration due to the radiation exposure. Further, to cope with changes in scanning speed in a horizontal deflection circuit subject to radiation exposure, there is provided a circuit for compensating for the changes, thereby making it possible to stabilize the color reproducibility by using this change compensation circuit together with the signal correction circuit for the video signal generating circuit.

The above and other objects, features and advantages of the present invention will be apparent from the following detailed description of preferred embodiments of the invention in connection with the accompanying drawings.

BRIEF DESCRIPTION OF THE DRAWINGS

FIG. 8 is an explanatory diagram showing an embodiment of color reproducibility correction;

DESCRIPTION OF THE PREFERRED EMBODIMENTS

Color television cameras may be classified into groups of tri-tube color television cameras, phase separation two-tube color television cameras, single frequency interleave single-tube television cameras, etc., in accordance with the image pickup system, the number of image pickup tubes, etc. The present invention can be applied to any kind of these groups of color television cameras.

Description will be made hereunder with respect to a single frequency interleave single-tube color television camera by way of example.

Figure 1:
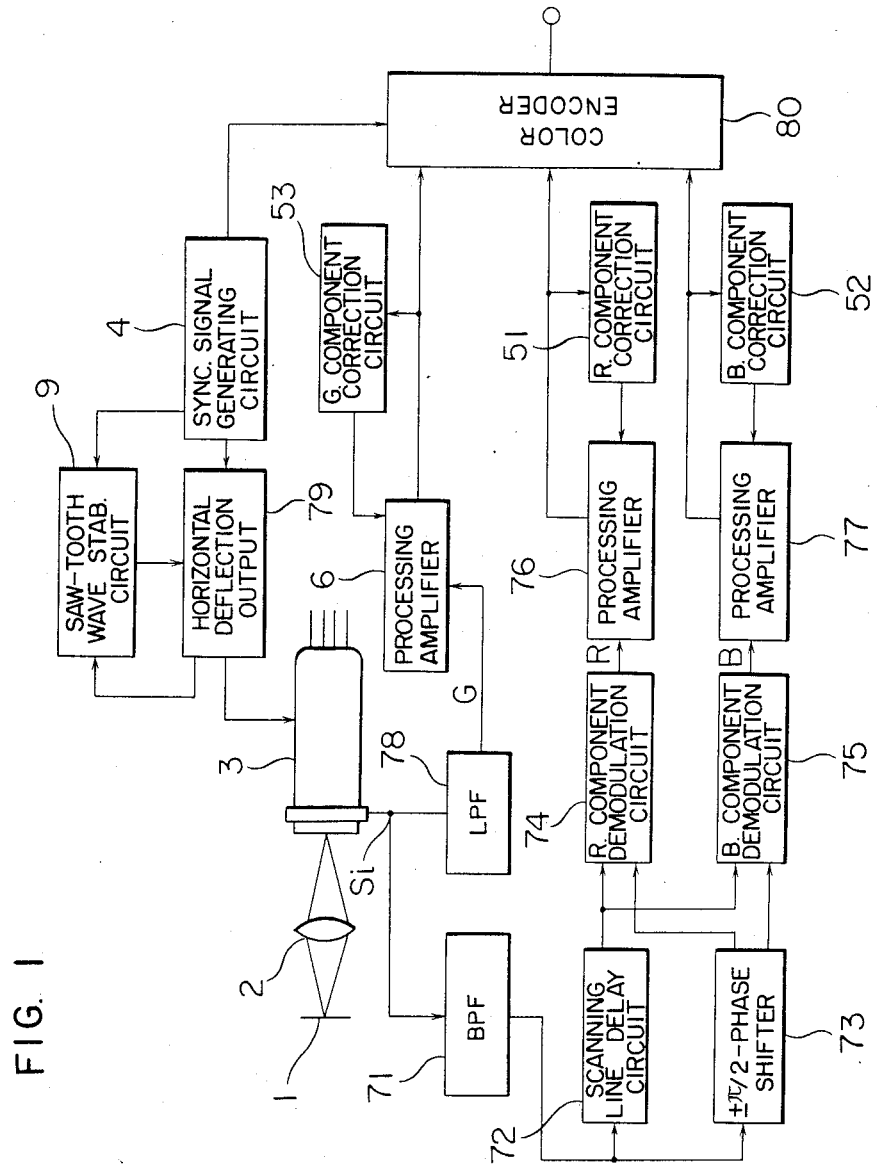
FIG. 1 is an entire block diagram of an embodiment of the radiation resistant color television camera according to the present invention.
Figure 2:
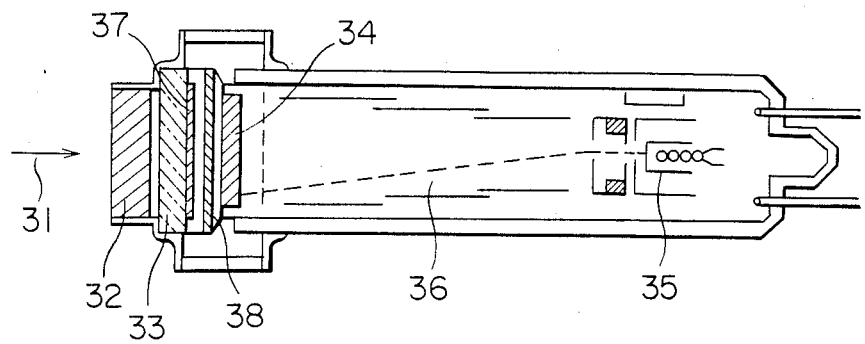
FIG. 2 is a cross-section of an image pickup tube.
Figure 3:
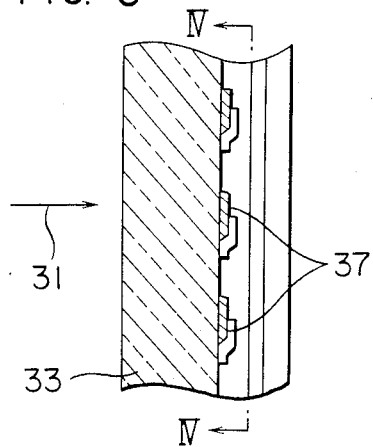
FIG. 3 is a cross-section showing the state in which stripe color filters are mounted on a face plate glass.
Figure 4:
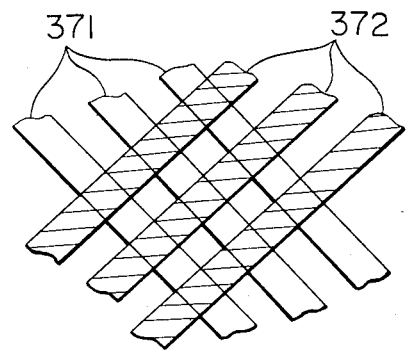
FIG. 4 is a plan view in cross-section along line IV—IV in FIG. 3.

In FIG. 1, the image of an object 1 is focused on a photoelectric surface of an image pickup tube 3 through a lens 2. An example of the image pickup tube 3 is shown in FIG. 2. Incident light 31 from the object 1 passes through a crystal filter 32 and a face plate glass 33 on which stripe color filters 37 are mounted, and then focused onto a target face 34. This image-focused portion is scanned by an electron beam 36 emitted from a cathode 35 so as to derive a video signal in the form of an electric signal, from a transparent conductive film 38. The position of the electron beam is controlled by a horizontal and a vertical deflection circuit. FIG. 3 is a detailed cross-section of the neighborhood of the face plate glass 33 of FIG. 2, showing the state of the stripe color filters 37 disposed on the face plate glass 33. FIG. 4 is a plan view in the cross-section along the line IV—IV in FIG. 3. The stripe color filters 37 includes two kind of stripe color filters, one being a yellow stripe filter 371 (a complementary color of blue; no transmission of a blue color) in which yellow stripes are disposed at regular intervals and the other being a cyan stripe filter 372 (a complementary color of red; no transmission of a red color) in which cyan stripes are disposed also at regular intervals, the respective stripes of the yellow stripe filter 371 and the cyan yellow stripe filter 372 intersecting each other. The remainder portions other than the stripes of the stripe filters 371 and 372 are transparent so as to allow all the colors (red, green, and blue) to pass through.

Figure 5:
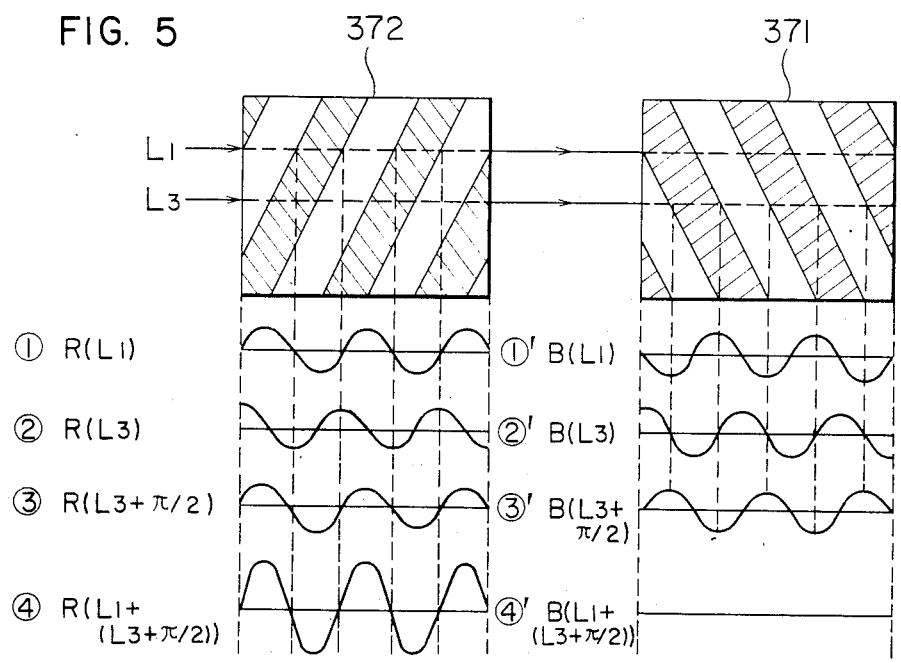
FIG. 5 is an explanatory diagram showing the principal of hue signal separation in a single frequency interleave system.

FIG. 5 shows waveforms of video signals passed through the respective stripe filters in the case where an object of a uniform color in which red and blue are mixed. The reason why each waveform is sinusoidal is that a high frequency component of a rectangular waveform passed through the respective stripe filter is cut away by a band pass filter (designated by 71 in FIG. 1) which will be described later. The angle of intersection between the respective stripe filters is selected such that the phase of the video signal Si derived from the image pickup tube 2 through the stripe filters is changed by $\pi/2$ every scanning line. The signal including color information modulated by the frequency of the stripe filters is made to be a mere color information signal through the band pass filter 71 corresponding to the stripe frequency. There is a correlation between the respective color information of the adjacent scanning signals ($L_1$ and $L_2$ in FIG. 5) so that the respective output signals ①, ①', ②, ②' are obtained from the cyan and yellow stripe filters, correspondingly to the scanning lines $L_1$ and $L_2$, as shown in FIG. 5. Since the spatial phase of each stripe filter is shifted by $\pi/2$ with respect to the two scanning lines $L_1$ and $L_2$, if the output by the scanning line $L_3$ is added to the output of by the scanning line $L_1$ with the phase of the former shifted by $+\pi/2$ or $-\pi/2$, the chrominance component of one of the two outputs disappears while the chrominance component of the other is doubled. FIG. 5 shows the case where the phase of the output with respect to the scanning line $L_3$ is advanced by $\pi/2$ relative to that with respect to the scanning line $L_1$, in which only the cyan side, that is, the red component, remains while the yellow side, that is, the blue component disappears. On the other hand, if the former is retarded by $\pi/2$, there appears only the blue component. Such processing is performed by a scanning line delay circuit 72, a $\pm\pi/2$ phase shifter 73, a red component demodulation circuit 74, and blue component demodulation circuit 75. The color-separated red and blue component signals are amplified by processing/amplifiers 76 and 77 respectively.

On the other hand, the low frequency component including a luminance signal and a green component is determined in the following manner. The stripes of the cyan stripe filter 372 allow the green component (G) and the blue component (B) to pass therethrough, while the stripes of the yellow stripe filter 371 allow the green component (G) and the red component (R) to pass therethrough. Accordingly, only the green component (G) passes through the intersecting portion between the cyan and yellow stripes. The red component (R) can be obtained from the transparent portions of the cyan stripe filters 372 (portions other than the hatched portions in the left-hand drawing in FIG. 5) because it does not pass through the cyan stripe portions of the cyan stripe filters 732. The blue component (B) can be obtained from the transparent portions of the yellow stripe filters 371 (portions other than the hatched portions in the right-hand drawing in FIG. 5) because it does not pass through the yellow stripe portions of the yellow stripe filters 731. Thus, each of the red component (R) and the blue component (B) is reduced in quantity to half of that of the original incident light and ($G+\frac{1}{2}R+\frac{1}{2}B$) is obtained as the low frequency component of the video signal produced from a low pass filter 78, and a luminance signal is obtained through a luminance signal processing circuit composed of a processing amplifier 6 as shown in FIG. 1.

The thus obtained red component signal, blue component signal, and luminance signal are separated by a color encoder 80 into an orange-cyan component of low color difference acuity, that is an I-axis component, and a green - violet component of high color difference acuity, that is a Q-axis component. The I-axis and Q-axis components are mixed with a synchronizing signal to form a composite video signal which is transmitted to the monitor side.

The signal processing and the circuit therefor described above are basically the same as those of the known single frequency interleave system. Next, the color reproducibility correction circuit which is one of the features of the present invention will be described.

As described above, in the color television camera according to the present invention, the deterioration in color reproducibility due to radiation exposure can be corrected. The concept of the correction is such that the respective chrominance components signals deteriorated by the causes I and II due to radiation exposure are compared with the respective chrominance component signals before deterioration to calculate the degree of deterioration and the amplification factor for each chrominance signal is controlled in accordance with the degree of deterioration to thereby correct the deteriorated chrominance signals into the state before deterioration.

Figure 6:
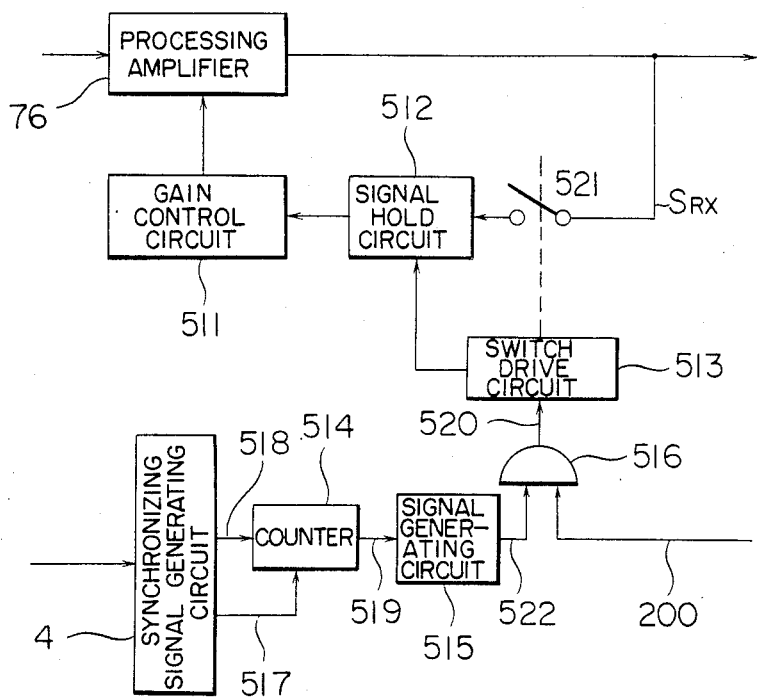
FIG. 6 is a block diagram showing an embodiment of a color reproducibility correction circuit.
Figure 7A:
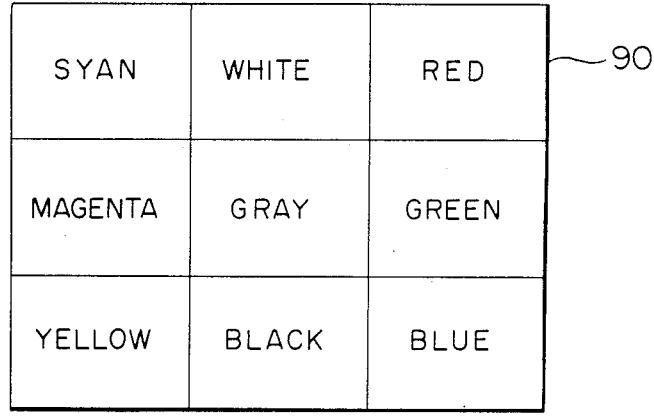
FIGS. 7(a) and 7(b) are diagrams showing color patterns used in color reproducibility correction.

FIG. 6 shows a first embodiment of the color reproducibility correction circuit. The positions of insertion of color reproducibility correction circuits 51 to 53 for the respective chrominance components (red, blue, and green) are shown in FIG. 1. The arrangement of only the red component color reproducibility correction circuit 51 is shown in FIG. 6 and will be described hereunder because all the red, blue, and green component color reproducibility correction circuits are the same. In order to obtain a reference signal to correct the color reproducibility, a color pattern 90 as shown in FIG. 7(a) is used. This reference signal is necessary to detect the degree of deterioration due to radiation in the respective chrominance component signals. That is, since the respective levels of the chrominance component signals when the color pattern of the reference signal is picked up prior to radiation exposure are known in advance, the color pattern is picked up under the same conditions (pick-up distance, intensity of illumination, etc.) as that time after the color television camera has been subject to radiation exposure, thereby detecting the deteriorated signal levels. An example of this method will be described by referring to FIG. 8.

For example, a monitor camera used in a nuclear reactor is an example of a color television camera used in an atmosphere of radiation. In such a case, the camera may be fixed at a predetermined position by some supporting members, or may be put on a railway so as to be displaced therealong by remote control, or may be mounted on a robot, etc.

FIG. 8 shows an example in which a color television camera 107 is mounted, for example, on a movable device 100 through a universal-head 101, in an atmosphere of radiation on the left side of a partition wall 104. A color pattern 90 is fixed at a predetermined position other than the portions to be monitored, and irradiated by illumination device 106. The color television camera is directed toward the color pattern 90 through the universal-head 101, and the zooming ratio, the focus, etc., are adjusted by the lens 2 (FIG. 1). These operations are performed by a console 102 disposed at a position at an atmosphere of non-radiation on the right side of the partition wall 104. Control signals for these operations are transmitted through a cable 103. Although in this example the correction is performed with the camera left in an atmosphere of radiation, it is a matter of course that the correction may be performed at a position at an atmosphere of non-radiation if the camera is removed from its used position and handled under the same image pickup conditions.

Figure 9:
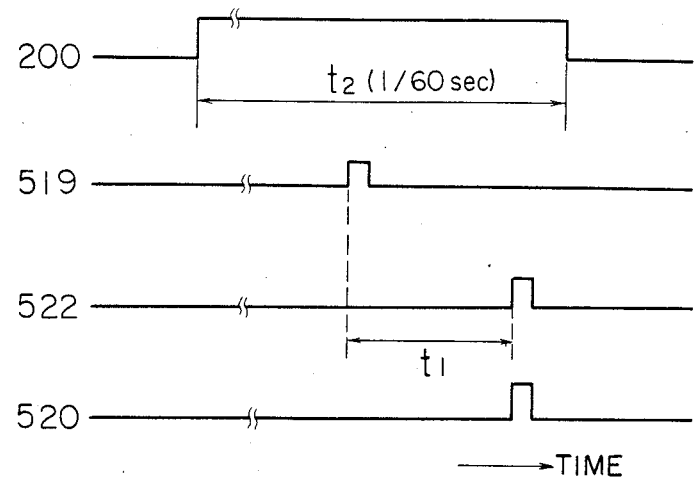
FIG. 9 is a time chart of signals in the color reproducibility correction circuit of FIG. 6.

If an operator selects a color reproducibility correction switch 105, a correction command signal 200 having an interval $t_2$ as shown in FIG. 9 is transmitted from the console 102. The interval $t_2$ is selected such that the central scanning line $L_a$ of red in the color pattern 90 can be surely extracted as shown in FIG. 8. In an interlace system, the interval $t_2$ is selected to be the period taken for scanning a $\frac{1}{2}$ frame. That is, since the period for one frame is 1/30 seconds, $t_2$ is 1/60 seconds. It is preferable to select the vertical position of the scanning line $L_a$ at a center of the red portion. Accordingly, a horizontal scanning signal corresponding to the center of the red portion in the color pattern 90 is usually selected.

In FIG. 6, a counter 514 counts a horizontal synchronizing signal pulse 518 produced from a synchronizing signal generating circuit 4 and produces a pulse signal 519 (see also FIG. 9) when its counts the $L_a$-th pulse 518. The counter 514 is reset by a vertical synchronizing signal 517. A pulse signal 522 as shown in FIG. 9 is produced from a signal generating circuit 515 after a lapse of time $t_1$ from the leading edge of the pulse signal 519. The temporal width $t_1$ is a period of time for scanning over a horizontal distance $L_x$ from the left end to the center of the red pattern in the color pattern 90 (see FIG. 8). This signal generating circuit 515 may be realized by using a known circuit having a function, as described above, to be responsive to a certain pulse so as to produce a pulse after a lapse of predetermined period of time after the firstmentioned pulse. For example, it is possible to compose the circuit 515 by using a delay circuit, or a combination of known logic elements.

When the correction command signal 200 (having an interval $t_2$ as shown in FIG. 9) as well as the pulse signal 522 are generated, a correction start signal 520 is produced from an AND gate 516 to actuate a switch drive circuit 513 to close a switch 521. At this time, the switch drive circuit 513 simultaneously triggers a signal hold circuit 512. The signal hold circuit 512 takes thereinto a red component signal $S_{RX}$ upon scanning the red of the color pattern 90, from the red component processing-/amplifier circuit 76. The signal $S_{RX}$ is a deteriorated red component signal after the color television camera has been subject to radiation exposure. This signal is held in the signal hold circuit 512 until a new correction command signal is issued. Reference numeral 511 designates a gain control circuit for generaing a signal for controlling the gain of the processing amplifier circuit 76. The gain control circuit 511 calculates a deterioration factor $\alpha R$ due to radiation on the basis of the respective levels of a known red component signal $S_{R0}$ when the red of the color pattern 90 is taken up by the camera which is not yet subject to radiation exposure, and a red component signal $S_{RX}$ when the red of the color pattern 90 is taken up by the camera which has been subject to radiation exposure, in accordance with the following relation:

$$\alpha_R = S_{RX}/S_{R0} \qquad (1)$$

Here, the gain of the processing amplifier 76 is controlled to be $1/\alpha_R$. As the result, when the red pattern is always seen, the red component signal level is $S_{R0}$, so that the deterioration in chrominance component can be corrected.

The gain control circuit 511 can be realized by using, for example, a microcomputer which may be an ordinary one having an intput/output interface, a memory, a CPU, and a calculating section. The expression (1) is calculated in the calculating section on the basis of the deteriorated red component signal $S_{RX}$ sampled/held in the signal hold circuit and the red component signal $S_{R0}$ before radiation exposure stored in the memory, and an output is produced in the form of an analog signal. Similar operations may be realized by a divider, etc., employing an analog circuit. Usually, the processing circuit includes an amplifier circuit unit for amplifying a video signal from an image pickup tube to a predetermined level and after amplification the signal waveform is processed into a predetermined shape. Accordingly, the gain control circuit 511 is arranged to control the amplification degree of the amplifier circuit unit in the processing amplifier 76 by the reciprocal number of the deterioration factor $\alpha_R$ obtained by calculating the expression (1).

The blue and green component color reproducibility correction circuits 52 and 53 perform processing similar to the red component color reproducibility correction circuit 51 to correct the deterioration in the respective chrominance components. Accordingly, even after radiation exposure, the same color reproducibility can be secured as that before radiation exposure.

Figure 7B:
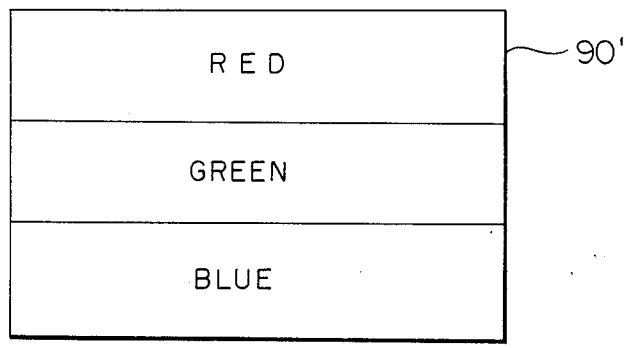

In the embodiment, cyan, magenta, etc., other than red, green, blue are disposed in the color pattern 90 as seen in FIG. 7(a), because it is more convenient if there are numbers of reference colors for adjustment when color reproducibility is adjusted so as to make the reproduced colors agree with those of the object with the human sense of sight. It is a matter of course that only the three colors, red, green, and blue, are basically sufficient for the color pattern according to the present invention. In such a case, the respective colors are disposed successively vertically as shown in the color pattern 90' in FIG. 7(b). In such a case, further, the timing of generation of the pulse 522 from the signal generating circuit 515 in FIG. 6 is not limited to $t_1$ (FIG. 9), but it may be selected to any value in the range of 0 to $t_2$, and arrangement may be made such that the counter 514 counts the horizontal synchronizing signal and produces a correction start signal to the switch drive circuit 513 when the count reaches $L_a$.

Figure 10:
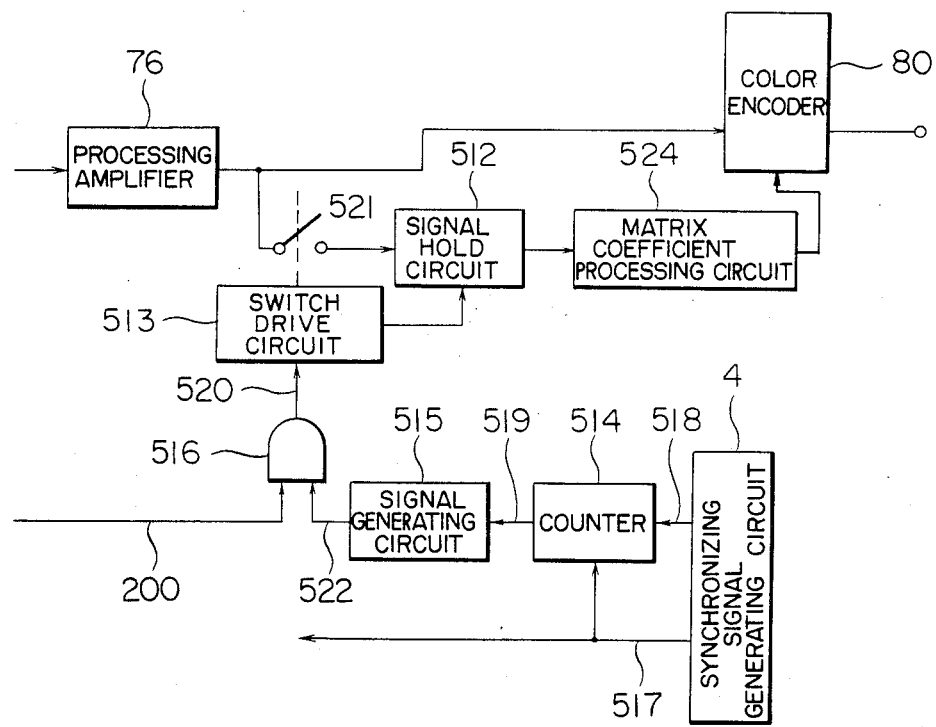
FIG. 10 is a block diagram showing another embodiment of the color reproducibility correction circuit.
Figure 11:
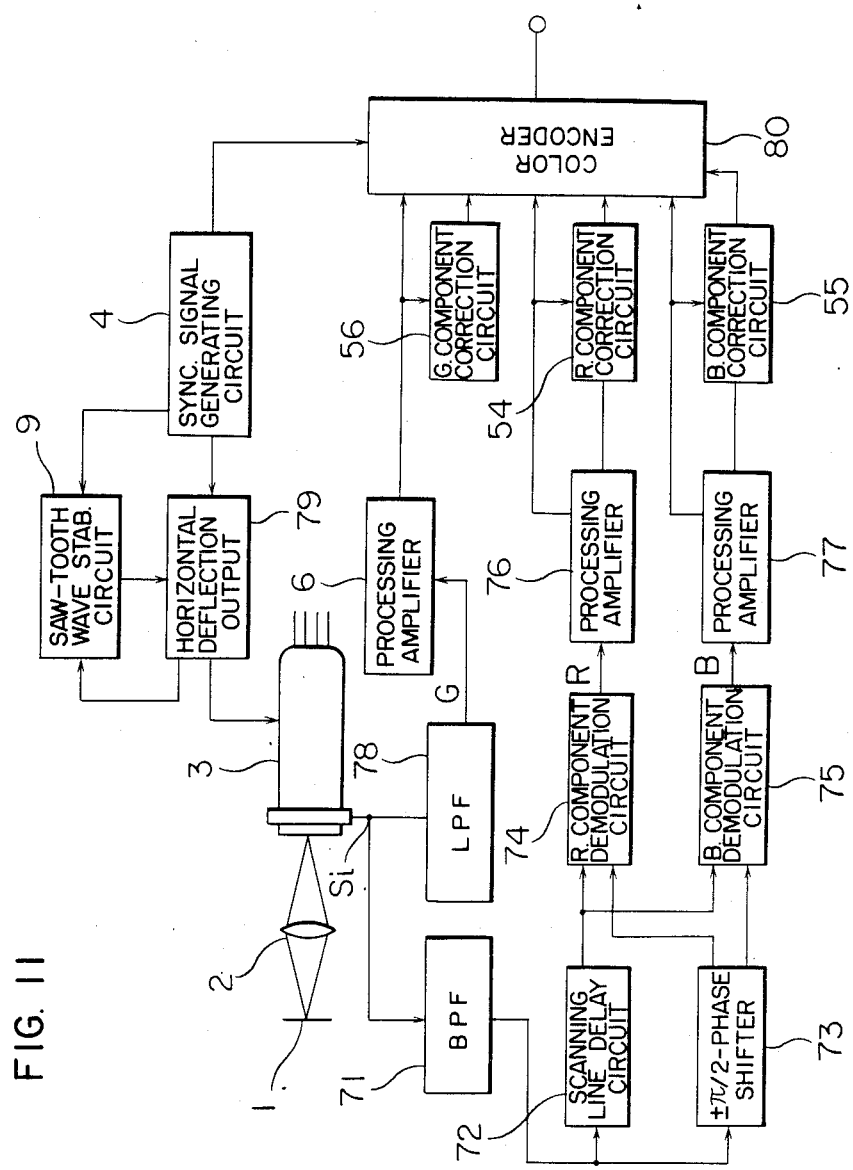
FIG. 11 is a circuit diagram showing another embodiment of the radiation resistant color television camera according to the present invention.

FIG. 10 is a diagram illustrating a second embodiment of the color reproducibility correction. In this second embodiment, coefficients in a linear matrix circuit of the color encoder 80 are corrected, in place of correction of the gain of the processing amplifier. FIG. 11 shows the arrangement of a red component reproducibility correction circuit 54, a blue component reproducibility correction circuit 55, and a green component reproducibility correction circuit 56. Since the respective color component reproducibility correction circuits are the same, only the red component reproducibility correction circuit 54 is illustrated in FIG. 10. A linear matrix circuit acts to make the level of each chrominance component signal agree with human sense of sight and calculates the following expression:

$$\begin{pmatrix} R_{out} \\ G_{out} \\ B_{out} \end{pmatrix} = \begin{pmatrix} a & b & c \\ d & e & f \\ g & h & i \end{pmatrix} \begin{pmatrix} R_{in} \\ G_{in} \\ B_{in} \end{pmatrix} \qquad (2)$$

where R, G, and B designate the red, green, and blue components respectively, a suffix (in) designates an input side, a suffix (out) designates an output side, and a–i designate coefficients of a matrix.

In FIG. 10, the arrangement and operations of the circuits other than a matrix coefficient processing circuit 524 are quite the same as those in the first embodiment shown in FIG. 1. The matrix coefficient processing circuit 524 calculates the radiation exposure deterioration coefficient $\alpha_R$ shown in the expression (1) and controls the coefficients a, b, and c of the matrix to be $1/\alpha_R$. Similarly to this, the matrix coefficients associated with the blue and green components are controlled by the blue and green component reproducibility correction circuits 55 and 53 respectively so as to obtain the following expression (3).

$$\begin{pmatrix} R_{out} \\ G_{out} \\ B_{out} \end{pmatrix} = \begin{pmatrix} \frac{a}{\alpha_R} & \frac{b}{\alpha_R} & \frac{c}{\alpha_R} \\ \frac{d}{\alpha_G} & \frac{e}{\alpha_G} & \frac{f}{\alpha_G} \\ \frac{g}{\alpha_B} & \frac{h}{\alpha_B} & \frac{i}{\alpha_B} \end{pmatrix} \begin{pmatrix} R_{in} \\ G_{in} \\ B_{in} \end{pmatrix} \qquad (3)$$

where $\alpha_G$ and $\alpha_B$ designate the respective radiation exposure deterioration coefficients of the green and blue components.

Thus, also in the second embodiment, the color reproducibility can be secured even after radiation exposure, similarly to the case before radiation exposure.

The particular arrangement of the matrix coefficient processing circuit 524 may be substantially the same as the gain control circuit 511 in the first embodiment. That is, the expression (1) is calculated on the basis of the red component signal $S_{R0}$ before radiation exposure stored in advance and the deteriorated red component signal $S_{RX}$ held in a signal hold circuit 512. The held signal is maintained until a new correction command signal is issued. A multiplier is provided at the output of the linear matrix circuit of the color encoder 80 and the red components output of the linear matrix is multiplied by the reciprocal number of the deterioration factor $\alpha_R$ obtained by calculating the expression (1). The same applies to the other chrominance components.

A third embodiment of the present invention will be described hereunder. In a frequency interleave color television camera, as described above, signals obtained by scanning the photo electric face are modulated by the spatial frequency of two kinds of stripe filters and then the respective chrominance components are extracted through band pass filters. Accordingly, changes in scanning speed results in changes in modulation frequency so as to make it difficult to perform correct reproduction. Although stability of scanning speed is therefore required in the frequency interleave color television camera, the scanning speed may change if the television camera is exposed to radiation.

Figure 12:
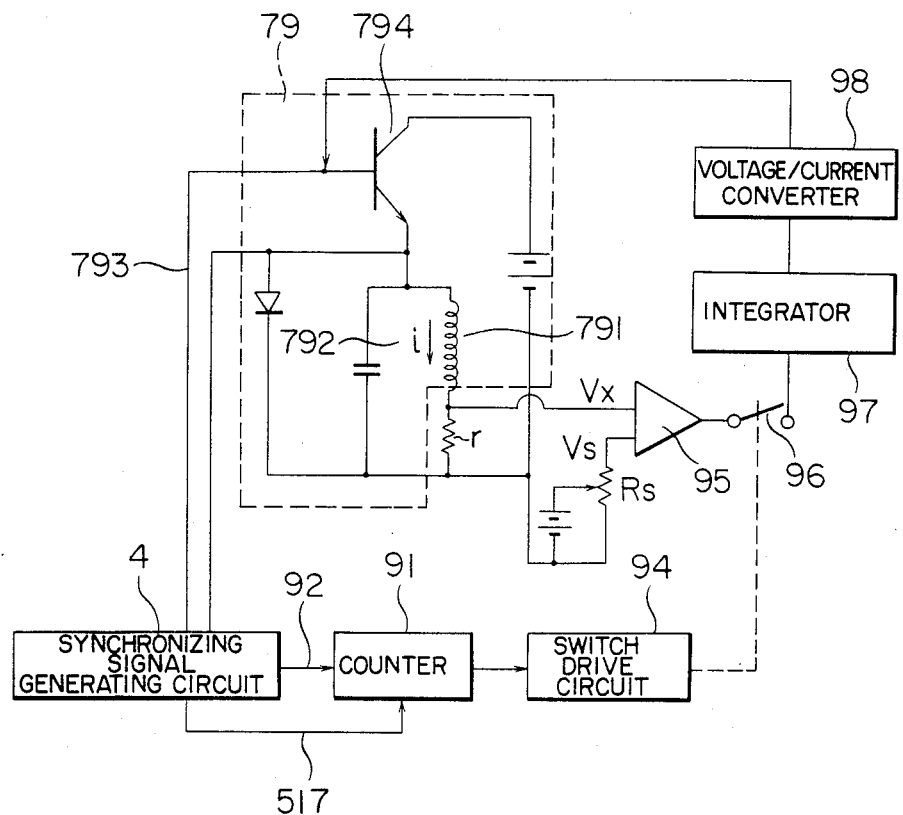
FIG. 12 is a circuit diagram showing an embodiment of the saw wave stabilizing circuit.
Figure 13:
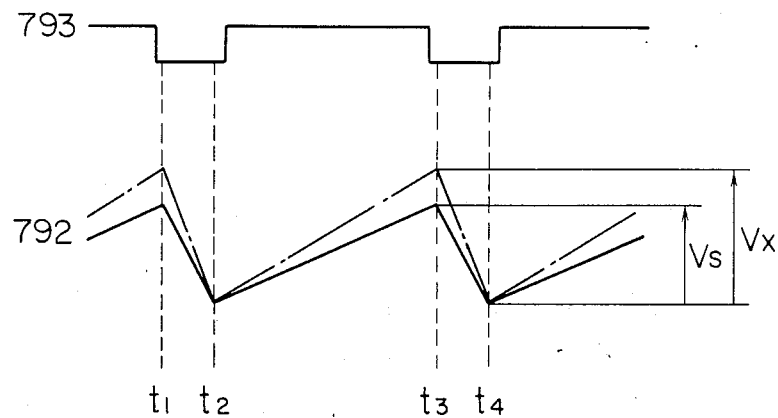
FIG. 13 is a diagram for explaining the operation of the saw wave stabilizing circuit shown in FIG. 12.

FIG. 12 illustrates an example of a saw tooth wave stabilizing circuit 9 in the frequency interleave color television camera. A switching type horizontal deflection output circuit 79 (hereinafter simply referred to as a horizontal deflection output circuit) is shown by an encircling broken line. In FIG. 12, the saw tooth wave stabilizing circuit 9 includes those circuit elements other than the horizontal deflection output circuit 79, and the synchronizing signal generating circuit 4. FIG. 13 shows the operation of the horizontal deflection output circuit 79. In the horizontal deflection output circuit 79, a horizontal deflection output transistor 794 is responsive to a base drive signal 793 produced from the synchronizing signal generating circuit 4 to cause a deflection coil current 792 of saw tooth waveform to flow through a horizontal deflection coil 791 so as to scan the photo electric surface. In FIG. 13, the periods $t_1-t_2$ and $t_3-t_4$ are the period of fly-back-line, and period $t_2-t_3$ is the scanning period of one scanning line. The deflection coil current 792 causes the electron beam 36 shown in FIG. 2 to scan the picture from right to left (or left to right) so as to successively derive a video signal from the transparent film 38. Accordingly, it is required to maintain the scanning speed constant. The radiation exposure may cause a change in the amplification factor ($h_{fe}$) of the horizontal deflection output transistor 794 to change the scanning speed of the deflection coil current 792 as shown by one dotted chain line in an FIG. 13, resulting in increase in slanting angle of the saw tooth waveform of the deflection coil current 792. That is, if the scanning speed increases the picture is enlarged and the electrical frequency of the stripe color filters 37 is made high. If the slanting angle becomes small, the picture is scaled down and the electrical frequency of the stripe color filters 37 is made low. The change in the electrical frequency of the stripe color filters 37 causes reduction in chrominance components passing through the band-pass filter 71, resulting in deterioration in color reproducibility. That is, since the filtering frequency of the band pass filter does not change even if the frequency scanning the image on the photo electric face picture changes, there are caused signal components which are not allowed to pass the band pass filter so as to make the signal levels lower than the normal cases. A resistor r having a resistance value not to deteriorate the linearity of the deflection coil is inserted in series with the horizontal deflection coil 791 so as to convert the magnitude of the horizontal deflection coil current 791 into a voltage which is referred to as a deflection coil voltage V. In an adder 95, a difference between the deflection coil voltage $V_s$ before radiation exposure and the deflection coil voltage $V_x$ at any point of time is obtained. The value $V_s$ is set in advance by a resistor $R_s$. Thus, $$\Delta V = V_s - V_x \qquad (4)$$

where $V_x$ represents the value of the deflection coil at a point of time $t_1$ ($t_3$) Accordingly, $V_s = V_x$ before radiation exposure, and it is sufficient to perform control so as to always make the difference $\Delta V$ zero. Accordingly, a switch 96 is closed at the point of time $t_1$ ($t_3$) so as to take the output of the adder 95 into an integrator 97 which performs integration in accordance with the following expression (5).

$$V_{kI} = V_{(k-1)I} + \Delta V_k \qquad (5)$$

where k represents a sampled count value (corresponding to a point of time) and $V_{kI}$ represents the output of the integrator 97 at the sampled count value k.

A voltage/current converter 98 produces a current corresponding to the value $V_{kI}$ which is in turn applied to the base of the horizontal deflection output transistor 794. If the deflection coil voltage $V_x$ at the point of time $t_1$ ($t_3$) is larger than the value $V_s$, the output current of the voltage/current converter 98 becomes small so that the base current and therefore the collector current of the horizontal deflection output transistor become small. Accordingly, the deflection coil current 793 becomes small to make the value $V_x$ small. As the result, the value $V_x$ approaches the value $V_s$ to stabilize the scanning of the saw tooth waveform deflection coil. The switch 96 is closed at the point of time $t_1$ ($t_3$) in the following manner. A one scanning line counter 91 counts a fundamental pulse signal 92 after a horizontal synchronizing signal 518 is reset, and drives a switch drive circuit 94 by one pulse when the count has reached a value corresponding to the time $t_1$ ($t_3$), thereby closing the switch 96 to cause it to input the value $\Delta V$ into the integrator 97 which holds this value $\Delta V$ thereafter.

In this manner, the saw tooth wave is stabilized at a predetermined reference value to thereby maintain the horizontal scanning speed constant.

We claim:

1. A radiation resistant color television camera comprising:

a video signal generation circuit for waveform shaping red, green, and blue color component signals obtained from an image pickup device having an image pickup tube and amplifying the same into a predetermined level, and for producing a composite video signal containing luminance information and chrominance information on the basis of the amplified color component signal, said video signal generating circuit including a processing/amplifying circuit for waveform shaping said red, green, and blue color component signals obtained from said image pickup device and amplifying the same into a predetermined level, and a color encoder for producing said composite video signal containing said luminance information and said chrominance information on the basis of the output of said processing/amplifying circuit; and a signal correction circuit for controlling the output of said video signal generating circuit in accordance with the quantity of deterioration of said red, green, and blue color component signals due to radiation exposure of said color television camera, thereby correcting the output of said video signal generating circuit to a value before radiation exposure, said signal correction circuit controlling the amplification degree of said processing/amplifying circuit in accordance with respective quantities of deterioration of said red, green, and blue color component signals, said signal correction circuit including means for storing respective predetermined reference red, green, and blue color signal levels before said color television camera is subject to radiation exposure, means for detecting respective red, green, and blue color signal levels after said color television camera is subject to radiation exposure, and correction means for calculating the respective degrees of deterioration of said red, green, and blue color component signals on the basis of said respective predetermined reference red, green, and blue color signal levels stored in said memory means and the red, green, and blue color signal levels after radiation exposure, and for changing the amplification degree of said processing/amplifying circuit in accordance with the calculated quantities of deterioration.

2. A radiation resistant color television camera according to claim 1 in which said image pickup device includes a single image pickup tube and operates in the form of frequency interleave system, and in which said television camera further comprises a horizontal deflection circuit for scanning said image pickup tube, means for detecting changes in the output of said deflection circuit due to radiation exposure, and a feedback circuit for receiving a changed output signal detected by said detecting means and a reference output level signal so as to control the amplification degree of said horizontal deflection circuit to make the difference between said received signals be zero.

3. A radiation resistant color television camera comprising:

a video signal generation circuit for waveform shaping red, green, and blue color component signals obtained from an image pickup having an image pickup tube and amplifying the same into a predetermined level, and for producing a composite video signal containing luminance information and chrominance information on the basis of the amplified color component signals, said video signal generating circuit including a processing/amplifying circuit for waveform shaping said red, green, and blue color component signals obtained from said image pickup device and amplifying the same into a predetermined level, and a color encoder for producing said composite video signal containing said luminance information and said chrominance information on the basis of the output of said processing/amplifying circuit; and a signal correction circuit for controlling the output of said video signal generating circuit in accordance with the quantity of deterioration of said red, green, and blue color component signals due to radiation exposure of said color television camera, thereby correcting the output of said video signal generating circuit to a value before radiation exposure, said signal correction circuit controlling matrix coefficients of a matrix circuit constituting said encoder in accordance with respective quantities of deterioration of said red, green, and blue color component signals, said signal correction circuit including means for storing respective predetermined reference red, green, and blue color signal levels before said color television camera is subject to radiation exposure, means for detecting respective red, green, and blue color signals levels after said color television camera is subject to radiation exposure, and correction means for calculating the respective degrees of deterioration of said red, green, and blue color component signals on the basis of said respective predetermined reference red, green, and blue color signal levels stored in said memory means and the red, green, and blue color signal levels after radiation exposure, and for changing the matrix coefficients of said matrix circuit in accordance with the calculated quantities of deterioration.

4. A radiation resistant color television camera according to claim 3, in which said image pickup device includes a single image pickup tube and operates in the form of frequency interleave system, and in which said television camera further comprises a horizontal deflection circuit for scanning said image pickup tube, means for detecting changes in the output of said deflection circuit due to radiation exposure, and a feedback circuit for receiving a changed output signal detected by said detecting means and reference output level signal so as to control the amplification degree of said horizontal deflection circuit to make the difference between said received signals be zero.

* * * * *